United States Patent

[11] 3,627,618

| [72] | Inventor | Ruben De Mello<br>Rua Jeronimo de Veiga 255, Sao Paulo, Brazil |
|---|---|---|
| [21] | Appl. No. | 807,566 |
| [22] | Filed | Mar. 17, 1969 |
| [45] | Patented | Dec. 14, 1971 |

[54] APPARATUS FOR COMPRESSION OF A COMPOSITE LOG POLYGONAL OUTLINE
4 Claims, 7 Drawing Figs.

[52] U.S. Cl. ................................................ 156/580,
 100/295, 156/304
[51] Int. Cl. ......................................................... B32b 31/00
[50] Field of Search ........................................... 156/304,
 580, 581, 582, 583; 100/42, 295

[56] References Cited
UNITED STATES PATENTS
3,505,152  4/1970  Risch et al. ................... 156/583 X Primary Examiner—Carl D. Quarforth
Assistant Examiner—Stephen J. Lechert, Jr.
Attorney—Michael S. Striker ABSTRACT: An apparatus for compression of a composite log of wood and polygonal outline which comprises a plurality of annular compression units used to apply simultaneous pressure to the external surface of an array of matched individual faceted elements of adhesive-coated wood so as to bond them together to form a composite log which can be laminated.

PATENTED DEC 14 1971 3,627,618

INVENTOR.
RUBEN DE MELLO
BY
Michael S. Striker
Attorney

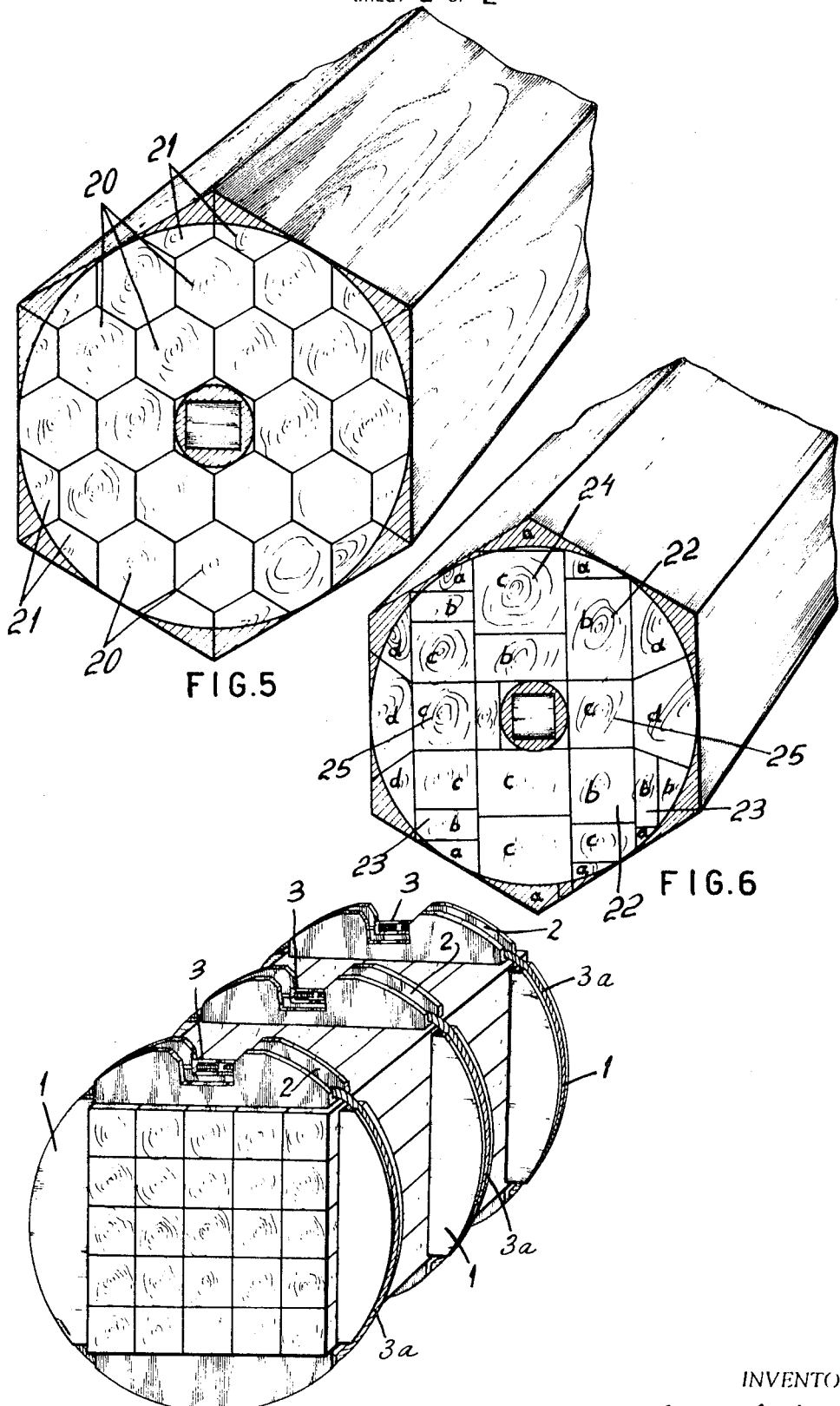

APPARATUS FOR COMPRESSION OF A COMPOSITE LOG POLYGONAL OUTLINE

BACKGROUND OF THE INVENTION

The present invention relates to an apparatus for producing wood veneer. In particular, the invention relates to an apparatus for converting a plurality of individual faceted elements of wood into a composite log which is free of voids between the thus assembled faceted logs.

It is already known in the art to bond together laths, strips and waste boards to form blocks of greater dimensions, which can be cut into boards of usable dimensions. U. S. Pat. No. 2,472,708 issued to Jones discloses a machine specifically designed for the purpose of joining together laths, strips and rejected boards to produce blocks of greater width. However, this patent discloses a joining process which resorts to a high-frequency heating system and does not utilize the thus formed block for lamination purposes.

Another application of waste wood presently known in the art is the particle board, which is made from agglomerated wood into sheets having a thickness range of 4 mm. to 40 mm., and is used in some instances to replace the thick plywood. The invention of particle board was a result of an increasing need for thick plywood boards, and a decreasing supply of trees of sufficient diameter for the manufacture of such boards. Trees with diameters between 10 to 15 cm. are used as a raw material source for the manufacture of particle board.

SUMMARY OF THE INVENTION

An object of the invention is to provide an apparatus for the making of composite logs from individual elements of wood.

The novel features which are considered as characteristic of the invention are set forth in particular in the appended claims. The invention itself, however, both as to its construction and its method of operation, together with additional features and advantages thereof, will be best understood from the following description of specific embodiments when read in connection with the accompanying drawings.

BRIEF DESCRIPTION OF THE DRAWINGS

FIG. 5 is a lengthwise sectional view of a composite log made of hexagonal and trapezoidal sections, shown in perspective;

FIG. 6 is a lengthwise sectional view of a composite log made of sections of various prismatic shapes and sizes, shown in perspective; and FIG. 7 depicts the apparatus used to compress the polygonal elements into a composite log.

DESCRIPTION OF THE PREFERRED EMBODIMENTS

Figure 1:
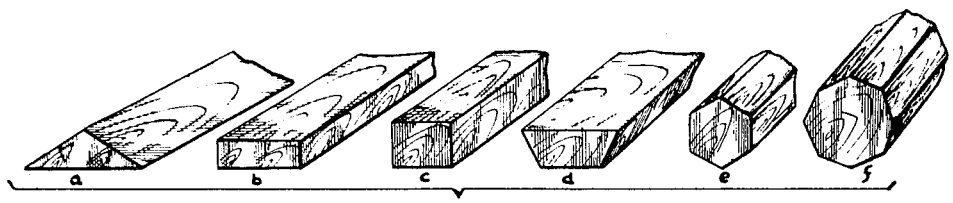
FIG. 1 is a perspective overhead view showing small diameter logs which have been cut into lengthwise sections having various polygonal shapes.

Referring to the drawings, FIG. 1 shows logs of small transverse diameter which have been cut into longitudinal units of various prismatic sectional shapes: triangular, rectangular, square, trapezoidal and hexagonal, denoted by $a$, $b$, $c$, $d$, $e$ and $f$, respectively in the Figure. The prismatic elements are predried either in air or in appropriate heaters and are coated on their external surfaces with a suitable wood adhesive. The prisms are fitted together to form a matched array that can be of any desired prismatic shape, as will be explained below in greater detail. The prisms are fitted together in such a manner that there are no voids between them in the interior portion of the matched array thus formed.

A compression apparatus, as shown in FIG. 7, is used to subject the matched array to a pressure greater than 2 kilograms per square centimeter (2 kg./cm.$^2$). The compression apparatus shown in FIG. 7 comprises clamping units 1, each having a groove 2 around its periphery which receives a flexible element, here shown as a cable 3$a$, having a suitable tightening means 3. When cable 3$a$ is tightened it thereby exerts a pressure against the external surface of the matched array which serves to bond the individual prismatic elements into a composite log.

The clamping units are positioned at adequate intervals along the length of the log, as shown by FIG. 7, so as to apply a constant pressure to the log. After a period of time which is dependent upon the nature of the adhesive being used, for example 24 hours, the clamping units are removed and the composite log is cured for approximately 8 days, after which time it is impregnated with conventional preservatives. Because the individual elements of wood which constitute the composite log have been predried, the composite log is more susceptible to impregnation and therefore will more readily absorb the preservative applied to it than would a freshly cut log which is still saturated with sap. The composite log is then subjected to a boiling process which softens the fibers if the wood is of a type which requires softening prior to lamination. With regard to the adhesive which is used to bond the prismatic elements to each other, for the present it is preferred to use an adhesive which has a phenol-resorcinol base and is resistant to the effects of the above-mentioned boiling process. In addition, the use of this type of adhesive will create an irreversible bond between the elements which is so strong that when subjected to bending stresses, rupture will occur in the body of the wood rather than along the lines of adhesion.

With regard to the moisture content of the wood used in this method of producing veneer, the present invention can be used to a particular advantage where the wood is of a relatively low density and low hardness, thereby permitting cold lamination, i.e. lamination without prior boiling. Examples of this type of wood are the various pinus species. If such a cold lamination process is used, only one subsequent drying phase will be required to reduce the moisture content, for example from 20 percent to 5 percent since the logs are normally received from the forest with a 20 percent moisture content. For other species of wood which cannot be cold laminated, the wood must be subjected to the boiling process, thereby increasing the moisture content to a much higher percentage, for example 80 percent, than its an received content. Thus, a longer drying time will be required.

Because the reduction of moisture from veneer is presently an expensive process which requires much time and elaborate drying equipment, the cold lamination process will bring about substantial savings in that it will be possible to dry the raw wood in the field without drying equipment, thereby reducing the cost of the production of veneer.

Prior to the present invention the lamination of logs could only be done with those logs which had a diameter greater than 30 cm., or preferably above 50 cm. This requirement has caused a serious shortage of raw material for the making of veneer due to the diminishing supply of wood logs with sufficiently large diameters for lamination. In some lumber-producing areas, particularly those in colder climates, where the trees generally are of small diameter, it has been necessary to develop special lamination techniques to utilize the trees to a maximum extent, such as sawing the logs longitudinally in successive laminators. For example, the first laminating operation would be done with logs having lengths of 240 cm. and a minimum diameter of 18 cm., the second lamination would be of logs with a length of 120 cm. and a minimum diameter of 12 cm.; and finally, 60 cm. lengths and a minimum diameter of 5 cm. However, because the length of the veneer has been reduced to each successive operation it must be fitted together to obtain a length of 240 cm. required for the manufacture of plywood.

The present invention overcomes this disadvantage in that the composite log, which will have a minimum diameter of at least 30 cm., can be laminated the same as if it were a natural log. Thus, by using the present invention it is possible to manufacture plywood in countries where native logs are in short supply.

In addition to the simple veneer, i.e. from wood of the same species, that can be obtained from this process, it is also possible to manufacture veneer composed of various kinds of wood which can be used for ornamental or decorative purposes.

Figure 2:
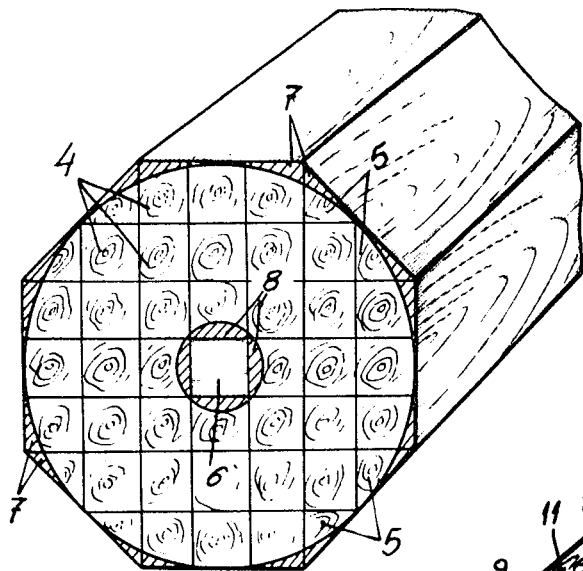
FIG. 2 is a perspective lengthwise sectional view of a composite log made up of square and triangular elements.

FIG. 2 shows one type of composite log which has been formed from prismatic elements 4 of square cross section in the inner portion and triangular sections 5 about the periphery, thus forming an octagonal composite log. The shaded areas 7 and 8 show material which is trimmed and cannot be used for lamination. Such waste wood can, however, be used as a material source for particle board manufacture, thereby deriving a maximum utilization of the wood used in the manufacture of plywood according to the present invention.

The elongated element 6 within shaded area 8 can be trimmed from the wood contained in the area as shown, and can be reused as a centering core in the laminating lathe. If it is desired to reuse this centering core 6 it should be of a hardwood which will endure repeated usage.

Figure 3:
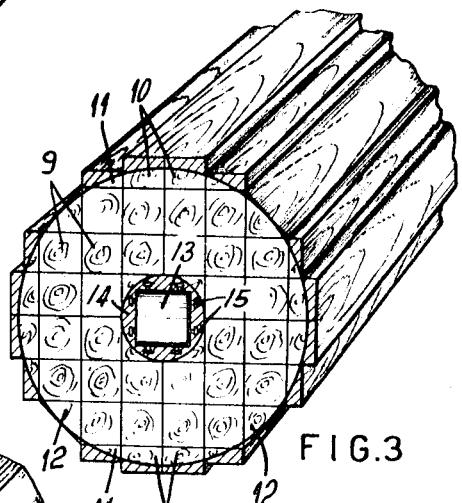
FIG. 3 is a lengthwise sectional view of a composite log made up of square, rectangular and triangular sections, shown in perspective.

FIG. 3 illustrates an alternative embodiment of the composite log wherein square units 9 form the interior portion, rectangular units 10 and 11 form part of the peripheral area, and triangular units 12 complete the peripheral portion. The shaded areas shown at the periphery of the log indicate material which is lost insofar as the manufacture of veneer wood is concerned. An alternative device for a centering core is shown by 13, which can be either a shaft or other longitudinal member onto which rectangular sections of wood 14 are secured by a fastening means 15 which is external to the composite log.

The utilization of such a centering core 13 will facilitate the fastening of the composite log to the lamination lathe and thereby aid in increasing the productive output of the lathe.

Figure 4:
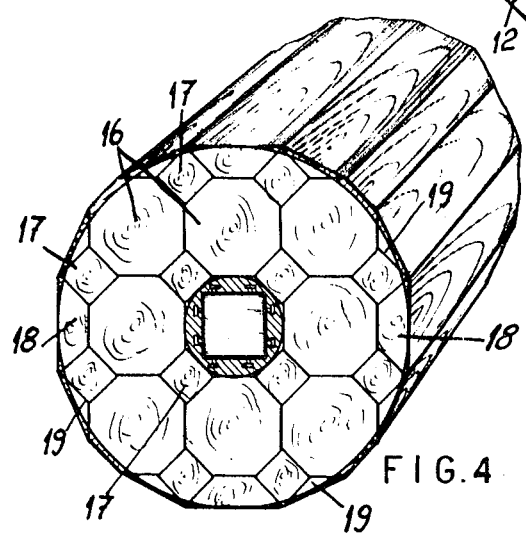
FIG. 4 is a lengthwise sectional view of a composite log made of octagonal, square and trapezoidal sections, shown in perspective.

FIG. 4 shows another alternative arrangement of elements to form a composite log wherein octagonal units 16 and square units 17 form the interior portion with trapezoidal units 18 and triangular units 19 at the periphery.

FIG. 5 shows an alternative arrangement using hexagonal units 20 and trapezoidal units 21 to form a hexagonal composite log. The shaded areas at the periphery indicate waste material.

FIG. 6 is an example of a hexagonal composite log which has been assembled from elements 22,23,24,25 of various sizes and shapes a,b,c,d thereby illustrating the fact that the elements can be assembled to form a composite log regardless of their dimensions or shape.

FIG. 7 illustrates, as previously described, a compression apparatus comprising clamping units 1 and cables 3, which is used to form the composite logs. FIG. 7 shows only a representative configuration of the compression apparatus, it being understood that other configurations will be used according to the external shape of the composite log. In the example shown, the compression apparatus is made up of three clamping units, each having four sections, however a composite log of the external shape shown in FIG. 2 requires three groups of eight sections.

An arrangement such as is shown in FIG. 4 requires 16 sections; in FIG. 5, six sections are required.

It is also possible to use in each clamping unit of FIG. 7 a pair of substantially V-shaped clamping sections, each of which flanks two sides of the composite log. It will be seen that the number of sections used for clamping in a unit can be less than the number of sides of the composite log which is to be compressed.

Without further analysis, the foregoing will so fully reveal the gist of the present invention that others can, by applying current knowledge, readily adapt it for various applications without omitting features which fairly constitute essential characteristics of the generic and specific aspects of the above-described contribution to the art.

What is claimed as new and desired to be protected by Letters Patent is set forth in the appended:

1. In an apparatus for compression of a composite log of polygonal outline which is assembled from a plurality of discrete faceted elements of wood and which is free of voids between such elements, a combination comprising a plurality of clamping units each comprising a plurality of sections located substantially in a plane, each of said sections having an inner face defining together a polygonal outline, said units being adapted to surround axially spaced and substantially parallel to each other a log of corresponding polygonal outline with the inner faces of said sections engaging corresponding outer faces of the log; and compression means for simultaneously pressing said sections inwardly for thus compressing a composite log, when the latter is located between said inner faces of said sections.

2. A combination as defined in claim 1, further comprising a core extending axially through said units.

3. A combination as defined in claim 2, wherein said core is of polygonal outline.

4. A combination as defined in claim 1, wherein said sections have external channels and wherein the channels of sections of each of said units together form a substantially complete circumferential groove, said compression means comprising endless flexible elements of adjustable length each received in one of said grooves.

* * * * *